G. M. FRIEBEL.
BELT GUIDE AND SHIFTER.
APPLICATION FILED DEC. 20, 1918.
1,309,474.
Patented July 8, 1919.
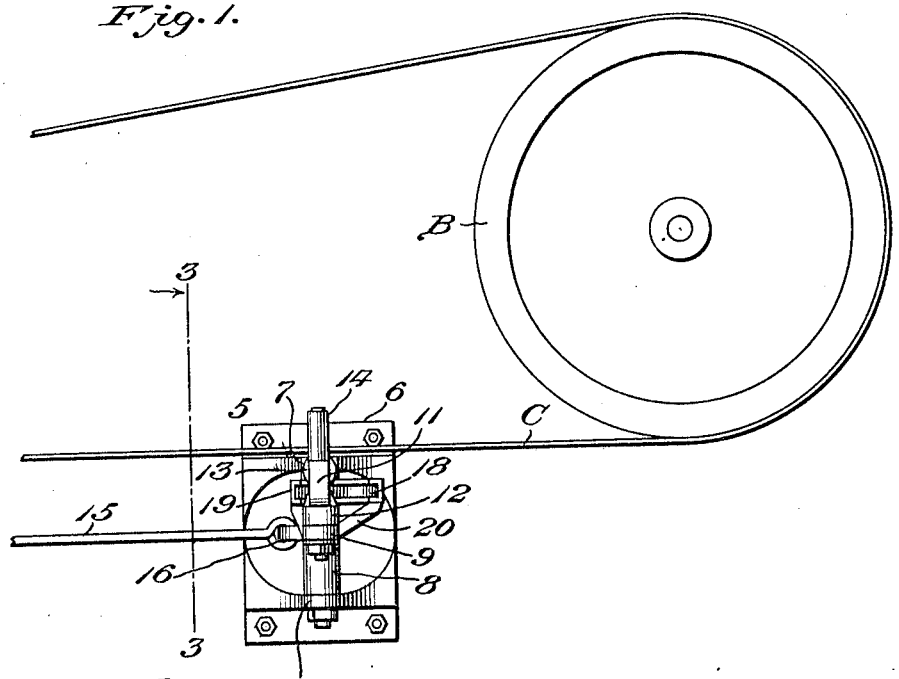
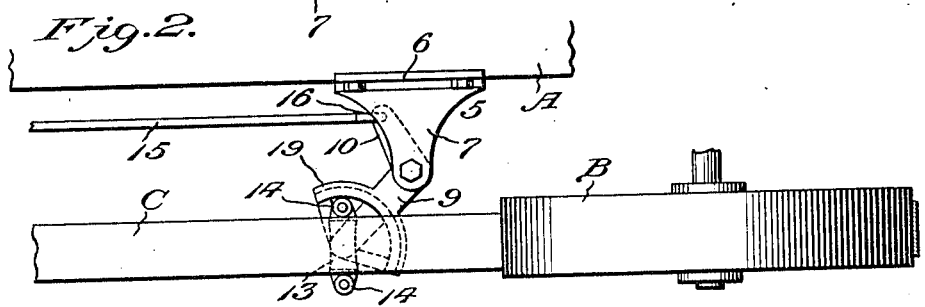
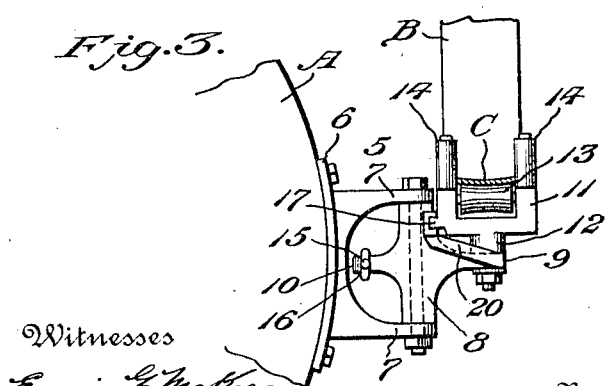
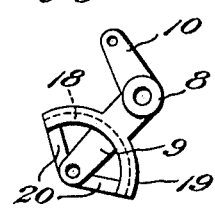
Inventor
George M. Friebel
Witnesses
Edwin F. McKee
By Victor J. Evans
Attorney

UNITED STATES PATENT OFFICE.

GEORGE M. FRIEBEL, OF LEBRET, SASKATCHEWAN, CANADA.

BELT GUIDE AND SHIFTER.

1,309,474. Specification of Letters Patent. Patented July 8, 1919.

Application filed December 20, 1918. Serial No. 267,686.

*To all whom it may concern:*

Be it known that I, GEORGE M. FRIEBEL, a subject of the King of Great Britain, residing at Lebret, in the Province of Saskatchewan and Dominion of Canada, have invented new and useful Improvements in Belt Guides and Shifters, of which the following is a specification.

This invention relates to belt guides, particularly to belt guides adapted for use upon traction or other engines, and has for its object the provision of a belt guide which may be secured upon any convenient location on the engine boiler and which is so constructed as to engage the sides of the belt whereby the belt will be properly guided in its movement and prevented from undesired lateral movement under the influence of wind or other causes, the device being so mounted and connected with operating means within convenient reach of the engineer whereby it may be shifted for throwing off the belt.

More specifically the object of the invention is the provision of a combined belt guide and shifter including an angle lever pivotally mounted in respect to the boiler of the engine and carrying a pivotally mounted bracket upon which are disposed rollers engaging against the edges and one side of the belt, the angle lever being movable whereby the bracket may be moved in respect to the belt so as to shift the belt laterally.

An important object is the provision of a device of this character in which the angle lever is provided with a curved trackway engaged by a shoe depending from the bracket whereby the bracket will not only be guided but also supported during its movement in order that strain will be removed from the pivot thereof.

An additional object is the provision of a device of this character which is simple and inexpensive in manufacture, highly efficient and durable in use and a general improvement of the art.

With the above and other objects and advantages in view, the invention consists in the details of construction to be hereinafter more fully described and claimed, and illustrated in the accompanying drawing in which:—

Figure 1 is a side elevation of my device shown in position upon a portion of a traction engine, Fig. 2 is a top plan view thereof with the upper stretch of the belt omitted.

Fig. 3 is a sectional view on the line 3—3 of Fig. 1 and

Fig. 4 is a detail view of the angle lever and guide.

Referring more particularly to the drawing the letter A designates a portion of the boiler of a traction or other engine and B designates the fly wheel about which is trained the belt C.

My device is designated as a whole by the numeral 5 and comprises a bracket 6 suitably secured upon some convenient part of the boiler A and provided with spaced outwardly extending ears 7 between which is journaled an angle lever 8 including the two arms 9 and 10. Pivotally mounted upon the arm 9 of the angle lever is an upstanding U-shaped bracket 11 including spaced arms and a shank 12 revolubly mounted upon the arm 9. A horizontally disposed roller 13 is journaled between the arms of the bracket 11 and engages against the lower side of the lower reach of the belt C. Journaled on the upper end of the arms of the bracket are vertically extending rollers 14 which bear against the side edges of the belt.

Under ordinary conditions the engagement of the rollers 13 and 14 with the belt will serve as a guide for preventing any lateral movement of the belt under the influence of wind or other causes. In order that the device may be shifted for throwing off the belt, I provide a rod 15 extending from any suitable lever, not shown, within convenient reach of the operator and pivotally connected with the arm 10 of the angle lever as shown at 16. It will be seen that longitudinal movement of the rod 15 will result in swinging movement of the angle lever 8 and consequent shifting of the belt.

In order to guide the bracket 11 in its movement and to remove the strain from its pivot, I provide upon the underside of the bracket 11 a shoe 17 which is disposed within a segmental slot 18 formed in a guide rail 19 secured upon the arm 9 of the angle lever and held in secured relation by means of braces 20. When the angle lever is shifted by means of the rod 15, the bracket 11 while moving with the angle lever will always maintain the same relation to the belt C, that is the rollers 14 will be in alinement transversely of the belt C. There is consequently relative movement between the bracket 11 and the angle lever 8, this movement being guided by engagement of the shoe 17 within the segmental slot 18.

From the foregoing description and a study of the drawing it will be apparent that I have thus provided a very simple and efficient device whereby a power belt will be guided in its movement and prevented from undesired lateral displacement and which may be bodily shifted so as to effect a throwing off of the belt.

While I have shown and described the preferred embodiment of the invention, it will of course be readily understood that I reserve the right to make such changes in the form, construction and arrangement of parts as will not depart from the spirit of the invention nor the scope of the subjoined claims.

Having thus described my invention I claim:—

1. A belt shifter and guide comprising a bracket, an angle lever pivoted on said bracket, an operating rod pivotally connected with one arm of said angle lever, a belt engaging bracket pivoted upon the other arm of said angle lever, a guide member secured upon said second named arm of said angle lever and provided with a segmental slot, and a shoe depending from said belt engaging bracket and disposed within said slot.

2. A device of the character described comprising a bracket, an angle lever journaled in said bracket for movement in a horizontal plane, a longitudinally movable rod pivotally connected with one arm of said angle lever, an upstanding U-shaped bracket pivoted upon the other arm of said angle lever, rollers journaled in said last named brackets and engaging against the edges and one side of one section of a belt, a guide member secured on said second named arm of said angle lever and provided with a segmental slot, and a shoe depending from said second named brackets and disposed within said slot.

In testimony whereof I affix my signature.

GEORGE M. FRIEBEL.

Copies of this patent may be obtained for five cents each, by addressing the "Commissioner of Patents, Washington, D. C."